United States Patent
Luik et al.

(10) Patent No.: US 9,999,932 B2
(45) Date of Patent: Jun. 19, 2018

(54) TOOL FOR MACHINING A WORKPIECE

(71) Applicant: HARTMETALL-WERKZEUGFABRIK PAUL HORN GMBH, Tuebingen (DE)

(72) Inventors: Matthias Luik, Reutlingen (DE); Christoph Hamm, Lambsborn (DE)

(73) Assignee: HARTMETALL-WERKZEUGFABRIK PAUL HORN GMBH, Tübingen (DE)

( * ) Notice: Subject to any disclaimer, the term of this patent is extended or adjusted under 35 U.S.C. 154(b) by 66 days.

(21) Appl. No.: 15/333,353

(22) Filed: Oct. 25, 2016

(65) Prior Publication Data

US 2017/0050248 A1 Feb. 23, 2017

Related U.S. Application Data

(63) Continuation of application No. PCT/EP2015/059141, filed on Apr. 28, 2015.

(30) Foreign Application Priority Data

Apr. 28, 2014 (DE) .................. 10 2014 105 908

(51) Int. Cl.
*B23C 5/00* (2006.01)
*B23B 51/06* (2006.01)
(Continued)

(52) U.S. Cl.
CPC ............ *B23B 51/06* (2013.01); *B23C 5/28* (2013.01); *B23D 77/006* (2013.01);
(Continued)

(58) Field of Classification Search
CPC ....... B23C 5/28; B23C 2210/02; B23B 51/06; B23B 2231/0204; B23B 2240/11; B23B 2250/12; B23B 2251/02; B23D 77/006
See application file for complete search history.

(56) References Cited

U.S. PATENT DOCUMENTS

| 1,409,753 A | 3/1922 | Moore |
| 2,555,302 A | 6/1951 | Cogsdill |
| (Continued) | | |

FOREIGN PATENT DOCUMENTS

| CA | 1278710 C | 1/1991 |
| CA | 1298104 C | 3/1992 |
| (Continued) | | |

OTHER PUBLICATIONS

International Search Report for International Application No. PCT/EP2015/059141 dated Jul. 16, 2015.
(Continued)

*Primary Examiner* — Will Fridie, Jr.
(74) *Attorney, Agent, or Firm* — Jason H. Vick; Sheridan Ross, PC

(57) ABSTRACT

A tool for machining a workpiece. The tool comprises a first tool component which comprises a first internal coolant bore and, on a first face side end, a first connection interface, wherein the first connection interface comprises a first end face for attaching a joining material as well as an elevation which protrudes from the first end face, wherein a first coolant outlet of the first internal coolant bore is arranged on the elevation. In addition, the tool comprises a second tool component which comprises a second internal coolant bore and, on a second face side end, a second connection interface, wherein the second connection interface comprises a second end face for attaching the joining material as well as a recess provided in the second end face, wherein a second coolant outlet of the second internal coolant bore is arranged in the recess. The first tool component and the second tool component are joined together by means of the joining material attached to the first and second end face in such a manner that the first coolant outlet is aligned with the second coolant outlet.

13 Claims, 5 Drawing Sheets

(51) Int. Cl.
*B23C 5/28* (2006.01)
*B23D 77/00* (2006.01)

(52) U.S. Cl.
CPC ... *B23B 2231/0204* (2013.01); *B23B 2240/11* (2013.01); *B23B 2250/12* (2013.01); *B23B 2251/02* (2013.01); *B23C 2210/02* (2013.01); *B23C 2250/12* (2013.01); *B23D 2277/02* (2013.01)

(56) References Cited

U.S. PATENT DOCUMENTS

| | | | |
|---|---|---|---|
| 3,085,453 A | 4/1963 | Mossberg | |
| 4,704,055 A | 11/1987 | Gühring | |
| 9,056,357 B2* | 6/2015 | Bozkurt | B23B 27/18 |
| 9,700,944 B2* | 7/2017 | Gey | B23B 27/10 |
| 2010/0322723 A1* | 12/2010 | Danielsson | B23B 51/02 |
| | | | 407/114 |
| 2012/0121347 A1* | 5/2012 | Osawa | B23B 51/02 |
| | | | 408/57 |
| 2013/0028669 A1* | 1/2013 | Cigni | B23C 5/10 |
| | | | 407/11 |
| 2013/0033009 A1* | 2/2013 | Hoffer | B23B 31/305 |
| | | | 279/4.01 |
| 2013/0051940 A1* | 2/2013 | Hobohm | B23C 5/10 |
| | | | 407/53 |
| 2013/0223943 A1* | 8/2013 | Gey | B23B 51/06 |
| | | | 408/59 |
| 2014/0321931 A1* | 10/2014 | Gey | B23B 51/02 |
| | | | 408/57 |
| 2015/0306686 A1* | 10/2015 | Mani | B23B 51/02 |
| | | | 407/40 |

FOREIGN PATENT DOCUMENTS

| | | |
|---|---|---|
| DE | 3309860 A1 | 8/1984 |
| DE | 3314349 A1 | 10/1984 |
| DE | 3615940 A1 | 11/1987 |
| DE | 3432615 C2 | 1/1988 |
| DE | 3611998 C2 | 10/1990 |
| DE | 202005020931 U1 | 12/2006 |
| DE | 102012001732 A1 | 8/2013 |
| EP | 0118035 B1 | 1/1987 |
| EP | 0853999 A1 | 7/1998 |
| EP | 1239986 B1 | 11/2006 |
| WO | WO 2011/023429 | 3/2011 |

OTHER PUBLICATIONS

Written Opinion for International Application No. PCT/EP2015/059141 dated Jul. 16, 2015.
International Preliminary Report on Patentability for International Application No. PCT/EP2015/059141 dated Nov. 10 2016.

* cited by examiner

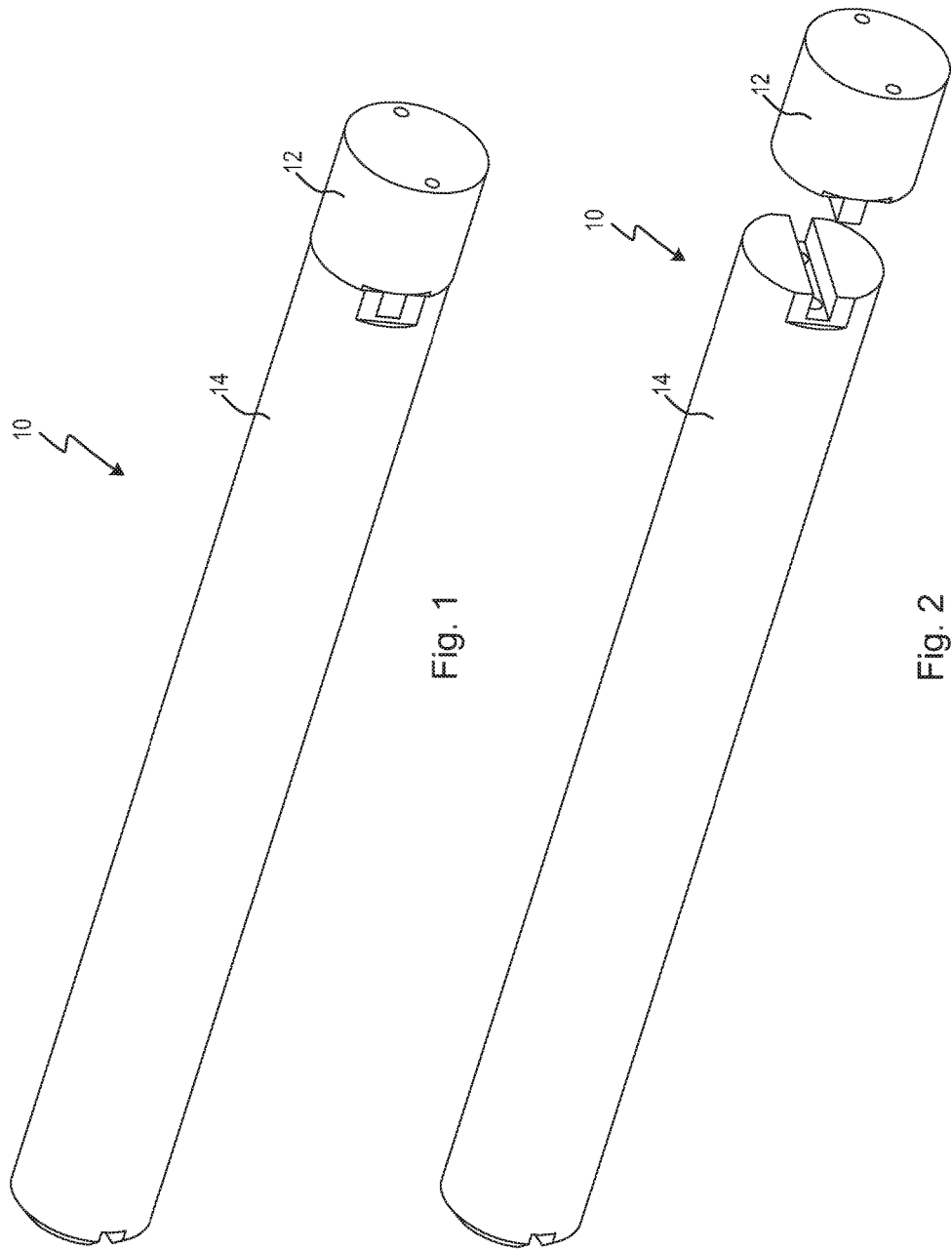

TOOL FOR MACHINING A WORKPIECE

CROSS REFERENCES TO RELATED APPLICATIONS

This application is a continuation of International Patent Application PCT/EP2015/059141, filed on Apr. 28, 2015 designating the U.S., which international patent application has been published in German language and claims priority from German patent application DE 10 2014 105 908.5, filed on Apr. 28, 2014. The entire contents of these priority applications are incorporated herein by reference.

BACKGROUND OF THE INVENTION

This disclosure relates to a tool for machining a workpiece, wherein the tool comprises two tool components which are joined together by means of a joining material. Furthermore, this disclosure relates to the individual tool components of the herein presented. Still further, this disclosure relates to a method for producing the herein presented tool.

Tools, for example, drilling, turning, milling, feather keyway broaching or reaming tools, are frequently produced from different, individual tool components which are permanently joined together during production of the tool. Said different tool components are, for example, the tool shank as well as an intermediate piece for receiving a cutting insert which is fixedly connected to the tool shank. During production of the tool, said tool components are fixedly joined together by means of a joining process, in particular by means of a soldering or bonding method. Although such soldering and bonding methods are already widely known, the joining of two tool components is deemed to be difficult when the tool components are components which comprise, in each case, one or more internal coolant bores which are to be aligned with one another when the tool is in the assembled state. The joining material (e.g. soldering or bonding material), which is applied on the interface between the two tool components, frequently then passes into the interior of the inner coolant bores, which can result in clogging and consequently in the coolant bores of the tool to be produced failing to function.

Clogging of the coolant bores by the joining material stems in the majority of cases from the two tool components to be joined being moved relative to one another either manually or by machine during the joining process in order to cover the connecting faces to be joined in a uniform manner with joining material. In this case, the joining material is also distributed then on top of the coolant outlets of the internal coolant bores which are arranged on the connection faces. The blocked or clogged coolant bores consequently have to be re-bored in a production step downstream. Insofar as one of the two or both tool components are produced from carbide, the bore diameter is then, however, smaller than the original diameter of the internal coolant bore such that the effective cross section of the internal coolant bore is ultimately reduced in a disadvantageous manner.

A further problem during the joining process consists in aligning the internal coolant bores of the two tool components relative to one another. The coolant outlets of the one tool component, with the tool in the mounted state, should be aligned exactly with the coolant outlets of the other tool component. In order to ensure this during the joining process, for example a wire or another aid is inserted through the coolant bore of the one tool component into the coolant bore of the other tool component. A relative movement, as mentioned above, for improved coverage of the contact faces with joining material is then, however, no longer possible. Apart from this, it is deemed to be difficult in the majority of cases to remove the wire or the other aid again from the coolant bores after the joining process. In addition, the coolant bores of the tool components to be joined can only be aligned with respect to one another in this way when the internal coolant bores are linear bores. However, if at least one of the coolant bores is a curved or coiled bore, such alignment of the two tool components in this way is not possible.

To overcome the above-named problems, attempts are also sometimes made to blow air through the internal coolant ducts during the joining process so that they do not fill up with joining material. However, only small relative movements between the two tool components to distribute the joining material onto the contact faces can be made in the case of said method also. Then again, the joining material is blown into the internal coolant bores as a result of said purge air supply such that parts of the joining material adhere to the inside surfaces of the coolant bores, which can lead, in turn, to clogging or to a disadvantageous reduction in the effective cross section of the coolant bores.

SUMMARY OF THE INVENTION

It is an object to provide a tool for machining a workpiece which comprises at least two tool components which are joined together by means of a joining material, wherein the connection interface between said two tool components is improved. The connection interface between the tool components is to be improved to the effect that it is possible to join the two components during production in a simpler manner without the above-mentioned problems occurring. Clogging of the internal coolant bores that run in the tool components is to be prevented in particular during the joining process as a result of an improved connection interface between the two tool components. In addition, the improved connection interface should enable a simplified alignment of the two tool components relative to one another during production such that it is ensured that after the joining process, the respective coolant outlets of the two tool components are aligned with one another exactly. In addition, it is an object to provide a method for producing the tool.

In view of this object, a tool for machining a workpiece is presented, said tool comprising:

a first tool component which comprises a first internal coolant bore which is realized as a coiled bore, and, on a first face side end, a first connection interface, wherein the first connection interface comprises a first end face for attaching a joining material as well as an elongated feather key which protrudes from the first end face, runs along a straight line, extends at least over a major part of the width of the first tool component in the radial direction and divides the first end face into two equally-sized first part-end faces, wherein a first coolant outlet of the first internal coolant bore is arranged on the elongated feather key; and a second tool component which comprises a second internal coolant bore which is realized as a coiled bore, and, on a second face side end, a second connection interface, wherein the second connection interface comprises a second end face for attaching the joining material as well as an elongated groove which is provided in the second end face, runs along a straight line, extends at least over a major part of the width of the second tool component in the radial direction and divides the second end face into two equally-sized second part-end faces, wherein a second coolant outlet of the second internal coolant bore is arranged in the elongated groove;

wherein the first tool component and the second tool component are joined together by means of the joining material attached to the first and second end faces in such a manner that the first coolant outlet is aligned with the second coolant outlet.

According to a further aspect, a tool component for a tool for machining a workpiece is presented, said tool component having a first internal coolant bore which is realized as a coiled bore, and a first connection interface which is arranged on a first face side end of the tool component and serves for connecting the tool component to another tool component, wherein the first connection interface comprises a first end face for attaching a joining material for connection to the other tool component as well as an elongated feather key which protrudes from the first end face, runs along a straight line, extends at least over a major part of the width of the first tool component in the radial direction and divides the first end face into two equally-sized first part-end faces, and wherein a first coolant outlet of the first internal coolant bore is arranged on the elongated feather key.

According to a further aspect, a tool component for a tool for machining a workpiece is presented, said tool component having a second internal coolant bore which is realized as a curved, non-linear bore, and a second connection interface which is arranged on a second face side end of the tool component and serves for connecting the tool component to another tool component, wherein the second connection interface comprises a second end face for attaching a joining material for connection to the other tool component as well as an elongated groove which is provided in the second end face, runs along a straight line, extends at least over a major part of the width of the second tool component in the radial direction and divides the second end face into two equally-sized second part-end faces, wherein a second coolant outlet of the second internal coolant bore is arranged in the elongated groove.

According to a still further aspect, a method for producing a tool for machining a workpiece is presented, said method having the method steps: (i) providing a first tool component which comprises a first internal coolant bore which is realized as a coiled bore, and, on a first face side end, a first connection interface, wherein the first connection interface comprises a first end face for attaching a joining material as well as an elongated feather key which protrudes from the first end face, runs along a straight line, extends at least over a major part of the width of the first tool component in the radial direction and divides the first end face into two equally-sized first part-end faces, wherein a first coolant outlet of the first internal coolant bore is arranged on the elongated feather key; (ii) providing a second tool component which comprises a second internal coolant bore which is realized as a curved, non-linear bore, and, on a second face side end, a second connection interface, wherein the second connection interface comprises a second end face for attaching the joining material as well as an elongated groove provided in the second end face, runs along a straight line, extends at least over a major part of the width of the second tool component in the radial direction and divides the second end face into two equally-sized second part-end faces, wherein a second coolant outlet of the second internal coolant bore is arranged in the elongated groove; (iii) providing a joining material to the first and/or second end face; (iv) aligning the first tool component relative to the second tool component, in such a manner that the first coolant outlet aligns with the second coolant outlet; and (v) connecting the first connection interface of the first tool component to the second connection interface of the second tool component by means of the joining material.

The herein presented tool is characterized in particular by an improved interface solution for connecting the two tool components of the tool. Both tool components comprise, to this end, connection interfaces which correspond with one another and in the present case are designated as first or second connection interfaces. Said two connection interfaces which correspond with one another function as compatible counterparts which are joined together during production of the tool as a result of soldering, bonding or by means of an alternative joining method. Both connection interfaces comprise in each case at least one end face for attaching the joining material which corresponds with the end face of the connection interface of the respective other tool component and, in the finished state of the tool, is connected to it. In addition to said end face, the connection interface (called first connection interface) of the first tool component comprises a feather key which protrudes from the end face (called first end face), on which feather key the coolant outlet of the coolant bore, which runs through the first tool component, is arranged. Corresponding to this, the connection interface (called second connection interface) of the second tool component comprises a groove provided in the end face (called second end face), in which groove the coolant outlet of the coolant bore, which runs through the second tool component, is arranged. The feather key which protrudes from the end face of the first tool component and the groove provided in the end face of the second tool component interact in the manner of a tongue and groove joint, the terms "feather key" and "groove" in the present case not meaning to define any special cross sectional form of the tongue or groove.

The feather key which is arranged on the first connection interface and the associated groove which is arranged on the second connection interface provide the advantage, on the one hand, of the coolant outlets of the coolant bores of both tool components being distanced in each case from the end faces on which the joining material is attached. As the feather key which protrudes from the first end face preferably fits with accuracy of fit into the groove provided in the second end face, the joining material used for the joining of the two tool components cannot pass into the coolant bores of the two tool components. When the tool is produced, the two tool components can also be moved in an oscillating manner relative to one another, guided by the feather key or groove, in order to distribute the joining material as well as possible on the two end faces of the connection interfaces. By means of the feather key or groove which are provided on the connection interfaces, the two tool components are also able to be positioned simpler relative to one another in such a manner that the first coolant outlet of the coolant bore of the first tool component is aligned with the second coolant outlet of the coolant bore of the second tool component. All in all, the tool can be produced in a simpler manner as a result. Not only the problems of the coolant bore clogging during production of the tool, but also the problems of the exact alignment of the two tool components which is relatively difficult to ensure are consequently eliminated.

The feather key provided on the first tool component and the groove provided on the second tool component are preferably realized as a linear feather key or groove which run diametrically over a major part of the end faces of the respective tool components. The feather key that is arranged on the first tool component therefore runs along a longitudinal direction which coincides with the radial direction of the first tool component. Likewise, the longitudinal direction of the groove that is arranged on the second tool component matches the radial direction of the second tool component. During production of the tool, the two tool components can consequently be moved in an oscillating manner relative to one another along the longitudinal direction of the groove or feather key for distributing the joining material, the groove or feather key remaining in engagement with one another. The joining material consequently remains on the part-end faces without flowing into the groove and consequently clogging up the coolant outlets of the internal coolant bores. "Substantially equally-sized end faces" is to be understood in the present case as the part-end faces preferably being exactly the same size, however being able to deviate in size in part as a result of the production requirements. The cross sectional form of the groove or feather key is not important. In principle, along with rectangular cross sectional faces, triangular, round or multi-sided cross sectional forms of the groove or feather key are also conceivable.

In place of a feather key which runs, as mentioned above, radially or diametrically over the first end face and a groove which is admitted radially or diametrically into the second end face, a cylindrical feather key which is arranged centrally on the first end face and a cylindrical groove provided in the second end face would also be conceivable. The only important point in this connection is that the tongue and groove joint enables a movement of the two tool components along one, preferably precisely one, degree of freedom. Said degree of freedom simplifies the distribution of the joining material. Apart from this, the two tool components then only have to be aligned relative to one another along said degree of freedom by means of the alignment faces.

The advantage of an elongated, linear groove or feather key that runs in the radial direction, however, is that the coolant bores are able to be aligned in a simpler manner, or a more or less automatically correct manner, relative to one another than in the case of a cylindrical groove or feather key. In the case of a cylindrical groove or feather key, said type of alignment of the coolant bores is essentially only provided automatically by the connection between the two components in the case of one single, centrally arranged coolant bore, not however where there are a plurality of decentrally (non-centrally) arranged coolant bores.

According to a refinement, the first tool component comprises a first alignment face and the second tool component comprises a second alignment face which corresponds with the first alignment face, wherein a distance from the first alignment face to the first coolant outlet is as large as a second distance from the second alignment face to the second coolant outlet.

Said alignment faces allow aligning the two tool components in such a manner relative to one another that the first coolant outlet that is provided on the first tool component is in alignment with the second coolant outlet that is provided on the second tool component. To this end, only the two alignment faces (first and second alignment faces) have to be aligned in a co-planar manner with respect to one another. This can occur, for example, manually or by machine using a tool. The first and second alignment faces are preferably realized as planar faces which are arranged on the outside circumference of the respective tool component. On account of the fact that the distance (first distance) between the first alignment face and the first coolant outlet is as large as the distance (second distance) between the second alignment face and the second coolant outlet, the two coolant outlets are automatically aligned with one another as soon as the two alignment faces are aligned in a coplanar manner with respect to one another.

During production of the tool, the joining material is therefore first of all applied onto one of the two end faces, then the two tool components are joined such that the two end faces contact one another and the feather key which protrudes from the first end face engages into the groove that is admitted into the second end face. In order to distribute the joining material over all of the surfaces of the end faces, the two tool components are then moved relative to one another along the longitudinal direction of the feather key or groove. The first and the second end faces are preferably realized as planar faces for this purpose. As soon as the joining material has been sufficiently distributed, the coolant outlets are aligned so as to be flush with respect to one another in the above-mentioned manner by means of the alignment faces.

According to a further refinement, the first tool component additionally comprises a third alignment face and the second tool component additionally comprises a fourth alignment face which corresponds to the third alignment face, wherein the first and the third alignment faces are arranged on oppositely situated sides on the outside circumference of the first tool component and in each case run transversely with respect to the first end face, and wherein the second and the fourth alignment faces are arranged on oppositely situated sides on the outside circumference of the second tool component and run transversely with respect to the second end face.

In this case, each tool component therefore comprises two alignment faces which correspond with two corresponding alignment faces of the respective other tool component. This additionally simplifies the alignment of the two tool components relative to one another. For aligning, the two tool components are aligned in such a manner with respect to one another that the first alignment face is coplanar with respect to the second alignment face and the third alignment face is coplanar with respect to the fourth alignment face. The first alignment face is preferably parallel to the third alignment face. Likewise, the second alignment face is preferably parallel to the fourth alignment face. As the alignment faces are arranged on oppositely situated sides of the respective tool component, the first alignment face is therefore at a distance from the third alignment face and the second alignment face is at a distance from the fourth alignment face. The distance between the first and third alignment faces, which are both arranged on the first tool component, is as large as the distance between the second and fourth alignment faces which are both arranged on the second tool component. Although "transversely" is to be understood in the present case as "non-parallel", the first and the third alignment faces preferably run orthogonally with respect to the first end face which is provided on the first tool component. In the same way, the second and the fourth alignment faces preferably run orthogonally with respect to the second end face which is provided on the second tool component. The two connection interfaces are therefore preferably symmetrical connection interfaces which correspond with one another.

Although up to now we have simply been talking about one internal coolant bore per tool component in each case, it is obvious that both the first and the second tool component can each comprise a plurality of internal coolant bores which correspond with one another.

According to a further refinement, a plurality of (in particular two) first internal coolant bores are consequently provided in the first tool component and a plurality of (in particular two) second coolant bores are provided in the second tool component, wherein the first internal coolant bores open out in each case into a first coolant outlet that is arranged on the feather key and the second internal coolant bores open out in each case into a second coolant outlet that is arranged in the groove, wherein both the first coolant outlets and the second coolant outlets are arranged decentrally on the respective tool component, and wherein, with the two tool components in the connected state, the first coolant outlets are aligned in pairs with the second coolant outlets. "Decentrally" is to be understood as "non-centrally", that is to say not coinciding exactly with the longitudinal axis of the respective tool component. "Aligned in pairs" is to be understood in the present case as in each case one of the coolant outlets of the first internal coolant bores being aligned with in each case one coolant outlet of the second coolant bores. The distances from the first alignment face to the coolant outlets of the coolant bores that are provided in the first tool component are consequently in each case as large as the distances from the second alignment face to the coolant outlets of the internal coolant bores that are provided in the second tool component. Likewise, the distances from the third alignment face to the coolant outlets of the internal coolant bores that are provided in the first tool component are consequently in each case as large as the distances from the fourth alignment face to the coolant outlets of the internal coolant bores that are provided in the second tool component.

According to a further refinement, at least parts of the first and of the third alignment faces are arranged on oppositely situated ends of the feather key. Likewise, according to said refinement, at least parts of the second and of the fourth alignment faces are arranged at oppositely situated ends of the grooves.

To align the two tool components relative to one another, it is consequently possible to use a pliers-like tool which cooperates directly with the ends of the groove or feather key. This enables a very simple and exact alignment of the two tool components relative to one another such that it is ensured, in a simple manner, that the first coolant outlet(s) align exactly with the second coolant outlet(s).

According to a further refinement, it is provided that the second coolant outlet is arranged in the groove base of the groove, and that the first coolant outlet is arranged on a top surface of the feather key which, with the two tool components in the connected state, contacts the groove base.

Arranging the coolant outlets in such a manner ensures that the coolant outlets are at a maximum possible distance from the respective end faces of the respective connection interface. Said maximum possible distance prevents the joining material coming into contact with the coolant outlets that are arranged in the groove base or on the top surface of the feather key.

According to a further refinement, the first and/or the second coolant bore is realized as a curved, non-linear bore, in particular as a coiled bore.

The present type of connection between the two tool components of the herein presented tool are proven to be advantageous precisely where the bores are curved in such a manner. The connection techniques mentioned in the introduction which make subsequent drilling of the internal coolant bores necessary, cannot be used in the case of such curved bores. On account of the tongue and groove joint presented and of the possibility of aligning the two tool components by means of two or more alignment faces which correspond with one another, a connection between two tool components with internal, curved coolant bores is however possible. In this case too, it is possible for the coolant outlets of the internal coolant bores of the respective tool components to be aligned with one another without being clogged by joining material.

The coolant outlets are in each case aligned with one another. In contrast, however, it is not absolutely necessary for the internal coolant bores, that is to say the longitudinal axes thereof, to be in alignment with one another with the tool in the assembled state. For example, the coolant bores of the one tool component can be provided as linear coolant bores and the coolant bores of the respective other tool can be provided as curved coolant bores such that they do not have to be forcibly aligned with one another at the connection point thereof. The sole important point is that the coolant outlets of the coolant bores are in alignment with one another, that is to say are located one above the other such that the coolant is transferred in a loss-free manner from the one tool component to the other tool component.

As already mentioned above, the above-named type of connection enables the use of several, potential joining processes. The two tool components or the connection interfaces thereof are preferably soldered or bonded together. The joining material is therefore preferably soldering or bonding material. In addition to the above-named advantages of the tongue and groove joint presented, said type of connection also has the advantage of being able to create a very stable connection between the two tool components such that high torques are able to be transmitted. The above-mentioned type of connection between two tool components can be used in the case of various tools for machining a workpiece. The tool can consequently be realized, for example, as a drilling, turning, milling, feather keyway broaching or reaming tool.

The tool components in the majority of cases are, on the one hand, a tool shank, and on the other hand, a connection piece for receiving a cutting insert. In this case, one of the two tool components is preferably produced from carbide and the respective other tool component is produced from steel. For example, the first tool component of the tool is realized as a tool shank of a drilling, turning, milling, feather keyway broaching or reaming tool which is produced from carbide, and the second tool component is realized as a connection piece produced from steel which comprises a receiving means for an exchangeable cutting insert. As the feather key or groove can be arranged, in principle, on both tool components, the tool component defined in the present case as the second tool component can also include the tool shank that is produced from carbide and accordingly the first tool component can include the connection piece that is produced from steel.

It is obvious that the features mentioned above and those yet to be mentioned below can be used not only in the combination specified in each case but also in other combinations or standing alone without departing from the scope of the present invention.

BRIEF DESCRIPTION OF THE DRAWINGS

FIG. 1 shows a perspective view of two tool components of the tool according to an embodiment of the present disclosure in the connected state;

FIG. 2 shows a perspective view of the two tool components shown in FIG. 1 in the separated state;

DESCRIPTION OF PREFERRED EMBODIMENTS

FIGS. 1 and 2 show two tool components 12, 14 of a tool 10 for machining a workpiece. FIG. 1 shows the two tool components 12, 14 in the assembled state, whereas FIG. 2 shows the two tool components 12, 14 in the separated state. As the present disclosure relates to the type of connection between the two tool components 12, 14, the two tool components 12, 14 are simply shown schematically in FIGS. 1-5. The tool 10 may comprise further tool components that are not shown. The tool components 12, 14 shown in FIGS. 1-5 are, for example, semi-finished products which are processed further in further processing steps during production to produce the finally finished product 10. A further reason for the abstract representation of the two tool components 12, 14 in FIGS. 1-5 is that the connection between the two tool components 12, 14 is able to be used in various tools 10 for machining a workpiece. The tool can be, for example, a drilling, turning, milling, feather keyway broaching or reaming tool.

In any case, the tool components 12, 14 are tool components which comprise in each case one or a plurality of internal coolant bores. The type of connection between the two tool components 12, 14 ensures, in particular, that said internal coolant bores can be easily aligned with respect to one another during production of the tool 10. In addition, the solution prevents the internal coolant bores becoming clogged in an unwanted manner by the joining material that is used for the permanent connection between the two tool components 12, 14 during production of the tool 10.

Figures 3A, 3B:
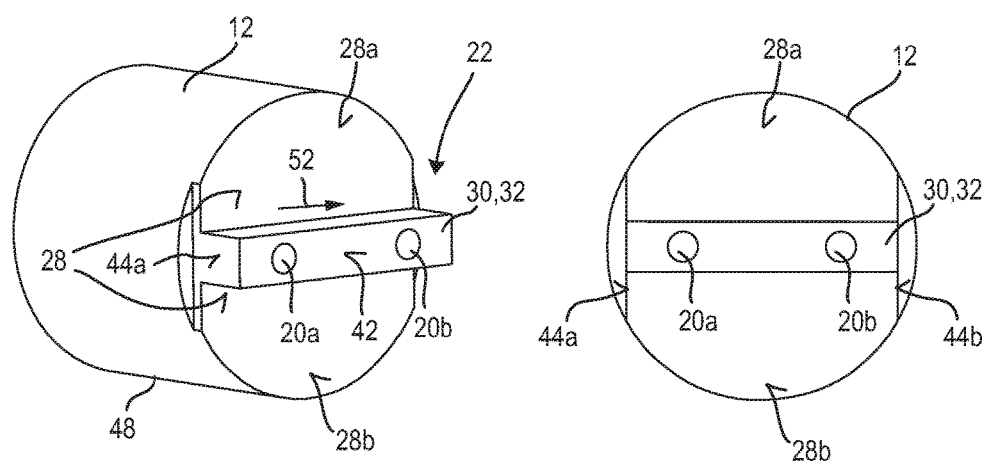
FIGS. 3A-3B show a perspective view (FIG. 3A) and a top view (FIG. 3B) of a first connection interface of the first tool component.
Figures 4A, 4B:
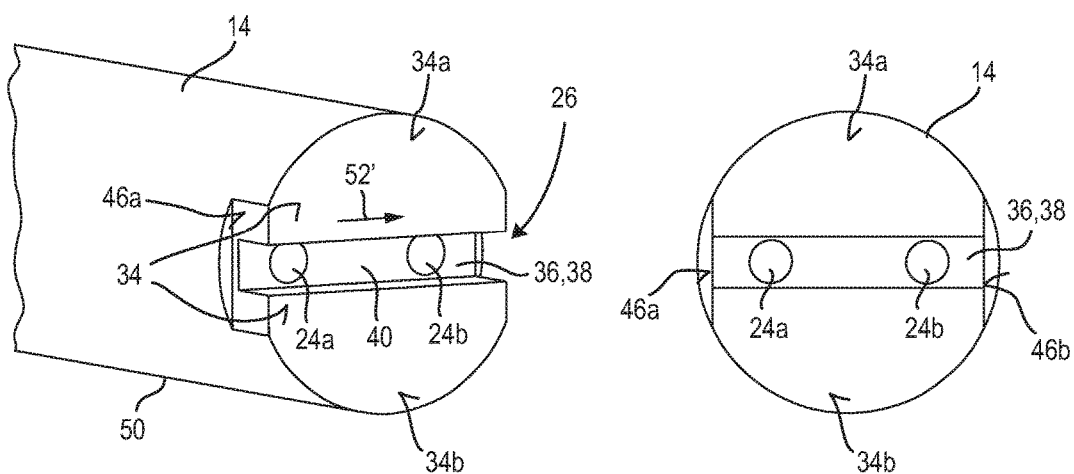
FIGS. 4A-4B show a perspective view (FIG. 4A) and a top view (FIG. 4B) of a second connection interface of the second tool component.
Figure 5:
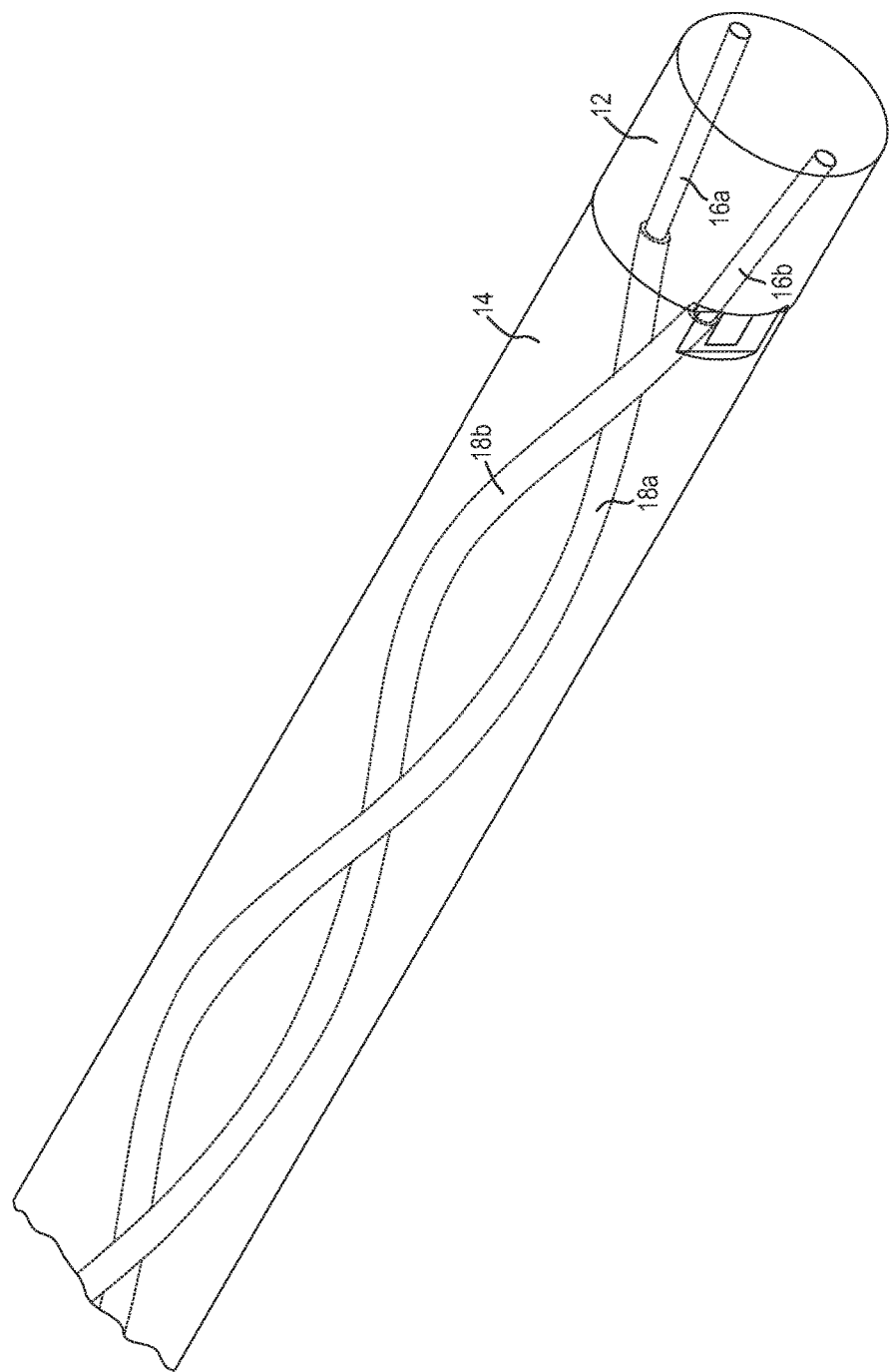
FIG. 5 shows a transparent view of the two tool components of the herein presented tool in the assembled state to illustrate the internal coolant bores arranged in the two tool components.

As can be seen from FIG. 5, according to the present embodiment both tool components 12, 14 each comprise in two internal coolant bores 16a, b or 18a, b. The internal coolant bores 16a, b of the first tool components 12 are designated in the present case as first internal coolant bores 16a, b. The internal coolant bores 18a, b of the second tool component 14, in contrast, are designated in the present case as second internal coolant bores 18a, b.

With the tool 10 in the assembled state, the first internal coolant bore 16a merges into the second internal coolant bore 18a. In the same way, the first internal coolant bore 16b merges into the second internal coolant bore 18b. Although two internal coolant bores 16a, b or 18a, b, are provided in each case in the present example shown, it is obvious that just one, or even more than two internal coolant bores 16, 18 can be provided in each case per tool component 12, 14.

The two first internal coolant bores 16a, b open out in each case into a coolant outlet 20a, 20b which is arranged on a first connection interface 22 of the first tool component 12. The second internal coolant bores 18a, b each open out into a respective second coolant outlet 24a, b which is arranged on a second connection interface 26 of the second tool component 14. The two connection interfaces 22, 26 are in each case arranged on the face side ends of the tool components 12, 14 to be joined together.

With the tool 10 in the assembled state, the two connection interfaces 22, 26, as shown in FIGS. 1 and 5, are joined together in such a manner that the coolant outlets 20a, b and 24a, b are in each case located one above another or are in alignment with one another. The first connection interface 22, which is arranged on the first tool component 12, comprises a first end face 28 which is divided into two part-end faces 28a, b. Said first end face 28 or said first part-end faces 28a, b serve for attaching the joining material to the first connection interface 22. The joining material (not shown) is, for example, a soldering or a bonding material. In addition, the first connection interface 22 comprises an elevation 30 which protrudes from the first end face 28 and in the present case is realized in the form of a feather key 32. Corresponding to this, the second interface connection 26, which is provided on the second tool component 14, comprises a second end face 34 which is divided into two part-end faces 34a, b. Said part-end faces 34a, b of the second connection interface 26 preferably comprise the same form and size as the part-end faces 28a, b of the first connection interface 22. Corresponding with the elevation 30 which is arranged on the first connection interface 22, the second connection interface 26 comprises a recess 36 which corresponds therewith and is admitted into the second end face 34. Said recess 36 is realized in the present case as an elongated groove 38.

With the tool 10 in the assembled state, the feather key 32, which is provided on the first tool component 12, engages preferably in a perfectly fitting manner in the groove 38 which is arranged on the second tool component 14. Consequently, the cross sectional form and size of the feather key 32 is preferably matched exactly to the cross sectional form and size of the groove 38. In the embodiment shown in FIGS. 1-5, the feather key 32 and the groove 38 have in each case a rectangular cross sectional form. In principle, however, the most varied cross sections (round, triangular or multi-sided cross sections) are conceivable as long as the cross sections are adapted to one another.

The second coolant outlets 24a, b of the second coolant bores 18a, b which run in the second tool component 14 are arranged in the groove base 40 of the groove 38. Corresponding to this, the coolant outlets 20a, b of the first internal coolant bores 16a, b which run in the first tool component 12 are arranged on a top surface 42 of the feather key 32 which, with the tool 10 in the assembled state, contacts the groove base 40 of the groove 38. The joining material (solder or bond) used to connect the two tool components 12, 14 can consequently be applied onto the end faces 28, 34. On account of the fit between the feather key 32 and the groove 38, the joining material, however, is not able to flow into the groove base 40 of the groove 38 and consequently is also not able to clog up the coolant outlets 20a, b or 24a, b. Consequently, the joining material is preferably only applied first of all on the first end face 28 or onto the first part-end faces 28a, b.

In addition, each of the two connection interfaces 22, 26 comprises in each case at least one alignment face 44a, b or 46a, b which, during production of the tool 10, serve for aligning the two tool components 12, 14 relative to one another. Although one such alignment face 44a, b or 46a, b per tool component 12, 14 is enough in principle, according to the embodiment shown in FIGS. 1-5 each of the two tool components 12, 14 comprises in each case two alignment faces 44a, b or 46a, b. The alignment faces 44a, b that are arranged on the first tool component 12 are designated in the present case as first alignment face 44a and third alignment face 44b. Correspondingly, the alignment faces 46a, b that are arranged on the second tool component are designated as second alignment face 46a and fourth alignment face 46b. All four alignment faces 44a, b or 46a, b are preferably realized as planar faces which are arranged on the outside circumference 48 of the first tool component 12 or on the outside circumference 50 of the second tool component 14. The first and the third alignment faces are arranged on oppositely situated end faces of the feather key 32. They preferably run parallel to one another and orthogonally with respect to the top surface 42 of the feather key 32. The second and the fourth end faces 46a, b are arranged on oppositely situated end faces of the groove 38. They also run parallel to one another and preferably orthogonally with respect to the groove base 40 of the groove 38.

By means of the above-mentioned alignment faces 44a, b or 46a, b, the two tool components 12, 14 can be aligned relative to one another in a relatively simple manner during production of the tool 10 such that the first coolant outlets 20a, b are aligned with the second coolant outlets 24a, b. This can be ensured, for example, by means of a pliers-like tool. To align the two tool components 12, 14, it is simply necessary to align the first alignment face 44a relative to the second alignment face 46a and the third alignment face 44b relative to the fourth alignment face 46b. This is to be understood as the first alignment face 44a being aligned in a coplanar manner to the second alignment face 46a, and the third alignment face 44b being aligned in a coplanar manner to the fourth alignment face 46b.

In order to ensure that the first coolant outlets 20a, b are aligned exactly with the second coolant outlets 24a, b after such an alignment, it is simply necessary to determine the distances from the alignment faces 44a, b or 46a, b to the respective coolant outlets 20a, b or 24a, b in a corresponding manner. The distances from the first alignment face 44a to the respective first coolant outlets 20a, b are as large as the distances from the second alignment face 46a to the respective second coolant outlets 24a, b. Likewise, the distances from the third alignment face 44b to the respective first coolant outlets 20a, b are consequently as large as the distances from the fourth alignment face 46b to the respective second coolant outlets 24a, b.

The tongue and groove joint 32, 38 between the tool components 12, 14 therefore prevents unwanted clogging of the coolant outlets 20a, b or 24a, b on the one hand, and enables, on the other hand, exact alignment of the two tool components 12, 14 relative to one another such that the coolant outlets 20a, b or 24a, b are in alignment with one another or the centre points thereof are located exactly above one another.

Figure 7:
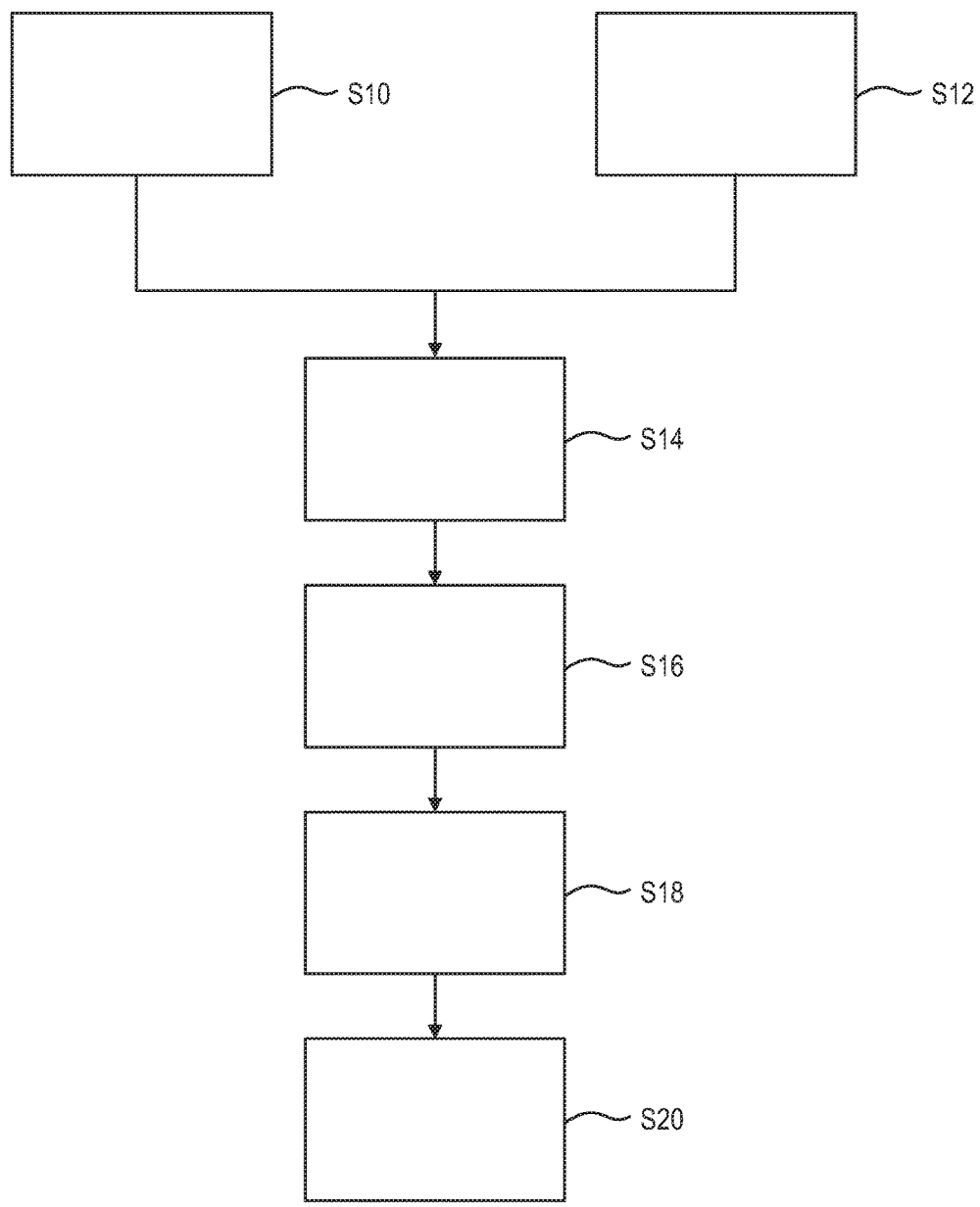
FIG. 7 shows a simplified flow diagram to illustrate the method according to the invention for producing the tool.

The production of the tool 10 or the process for joining the two tool components 12, 14 can therefore be summarized, as follows, by way of the method sequence shown schematically in FIG. 7:

The two tool components 12, 14 are provided with the above-named features in the first two method steps S10 and S12.

The joining material (soldering or bonding material) is then applied to the first and/or second end face 28, 34 in method step S14. The joining material is preferably applied to just the first end face 28 as applying joining material to the second end face 34 risks the joining material flowing into the groove 38 prior to the joining of the two tool components 12, 14.

In the next method step S16, the two tool components 12, 14 are joined together such that the feather key 32, which is arranged on the first tool component 12, engages in the groove 38 which is arranged on the second tool component 14. On account of said feather key and groove joint, there is no contact whatsoever between the joining material and the coolant outlets 20a, b or 24a, b.

In the subsequent method step S18, the two tool components 12, 14 are preferably moved relative to one another along the longitudinal direction 52 of the feather key 32 or along the longitudinal direction 52' of the groove 38. The named longitudinal directions 52, 52' of the feather key 32 or of the groove 38 preferably run orthogonally with respect to the alignment faces 44a, b or 46a, b. Said oscillating movement serves for distributing the joining material on the end faces 28, 34 or the part-end faces 28a, b or 34a, b.

As soon as the joining material has been distributed sufficiently well, the two tool components 12, 14 are aligned relative to one another in the above-named manner by way of the alignment faces 44a, b or 46a, b such that the coolant outlets 20a, b of the first tool component 12 are aligned with the coolant outlets 24a, b of the second tool component 14. This can occur either by machine or by hand. Finally, the two connection interfaces 22, 26 are permanently joined by means of the joining material. Insofar as the joining material is solder, the two tool components 12, 14 are therefore soldered together in method step S20. Where a bonding material is used, the method step S20 includes the hardening of the bonding material.

It is obvious that the above-named method sequence refers simply to the joining of the two tool components 12, 14. Further method steps connected downstream usually include the finishing of the tool 10, the faces or the effective contours of the tool being input into the tool components 12, 14.

Figure 6:
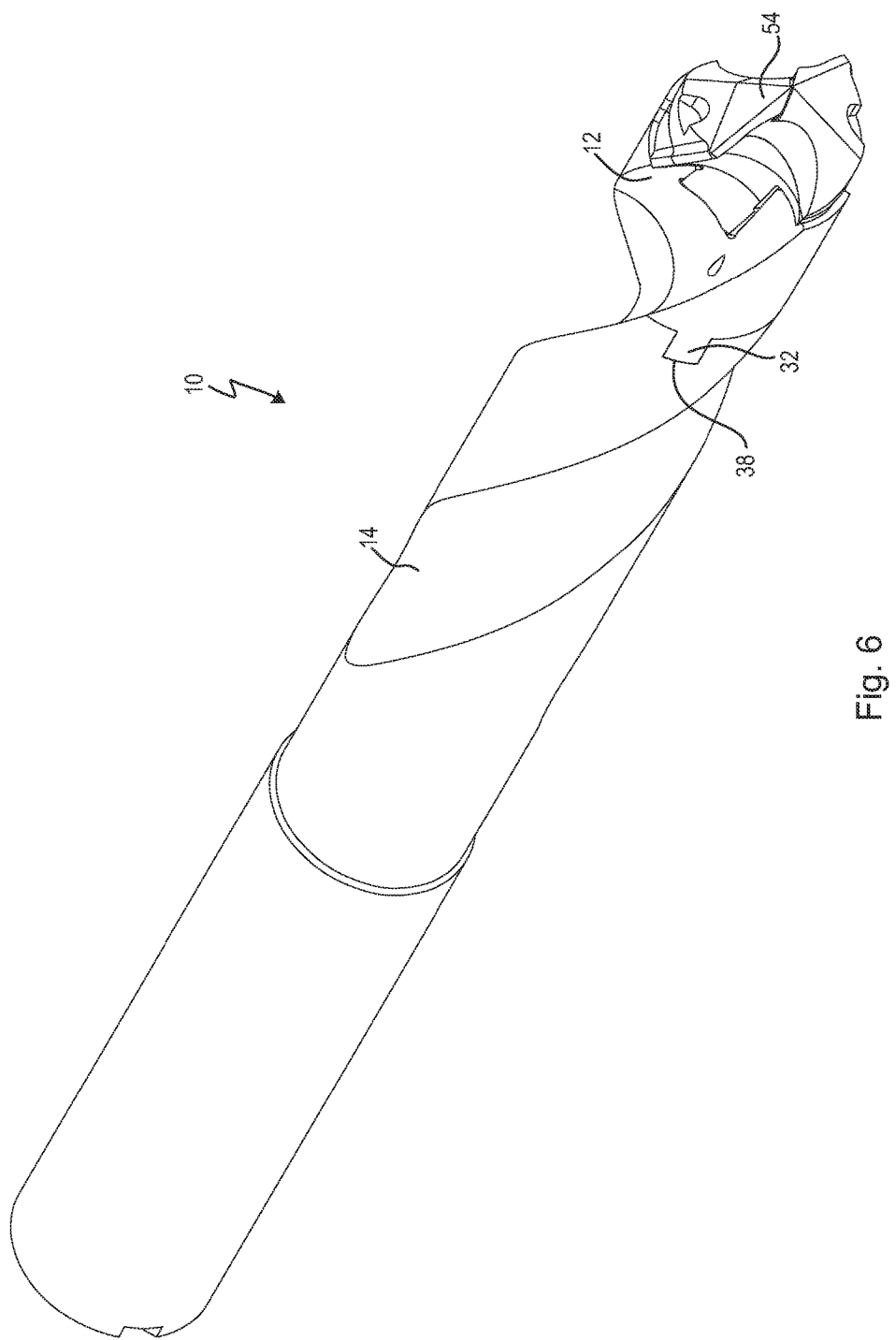
FIG. 6 shows a perspective view of an embodiment of the herein presented tool.

FIG. 6 shows a drilling tool as an example of a tool 10 for machining a workpiece, which drilling tool comprises two tool components 12, 14 which have been joined together in the above-named manner. The first tool component 12, in this case, is developed as a connection piece which comprises a receiving means in which a cutting insert 54 can be received so as to be exchangeable. The second tool component 14, in contrast, is the shank of the drilling tool. The tool shank (second tool component 14) and the cutting insert 54 are preferably produced from carbide, whereas the connection piece (first tool component 12) is preferably produced from steel. The above-named type of connection therefore ensures, in the case of said drilling tool 10, the aligning of the coolant outlets of the internal coolant bores, which run in the tool shank, with the coolant outlets of the internal coolant bores which run in the connection piece. The coolant bores cannot become clogged during production for the above-named reasons. This is consequently particularly advantageous as the coolant bores 16a, b or 18a, b of the two tool components 12, 14 of the drilling tool 10 are not axially parallel bores. As shown in FIG. 5, the second internal coolant bores 18a, b are realized as coiled bores, whereas the first internal coolant bores 16a, b are realized as linear bores. Without the above-named method, alignment of the two tool components 12.14 would consequently be relatively difficult to ensure. In addition to the above-named advantages, the tongue and groove joint presented here between the two tool components 12, 14 additionally ensures torque entrainment, although this is not the main purpose of the solution presented.

The above-named connection technique can also be transferred to other tools for machining. The drilling tool shown in FIG. 6 should consequently only be seen as a possible example. In addition, it must be mentioned that the diameter of the first coolant outlets 20a, b does not necessarily have to match the diameter of the second coolant outlets 24a, b. With the two tool components 12, 14 in the aligned state, just the centre points of the first coolant outlets 20a, b should coincide with the centre points of the second coolant outlets 24a, b. It also not necessary to align the centre axes of the first internal coolant bores 16a, b with the centre axes of the second internal coolant bores 18a, b. In addition, it must be mentioned that both the first and the second internal coolant bores 16a, b or 18a, b can be realized both as linear bores and as coiled or curved bores.

What is claimed is:

1. Tool for machining a workpiece, said tool comprising:
    a first tool component which comprises a first internal coolant bore which is realized as a coiled bore, and, on a first face side end, a first connection interface, wherein the first connection interface comprises a first end face for attaching a joining material as well as an elongated feather key which protrudes from the first end face, runs along a straight line, extends at least over a major part of the width of the first tool component in the radial direction and divides the first end face into two equally-sized first part-end faces, wherein a first coolant outlet of the first internal coolant bore is arranged on the elongated feather key; and
    a second tool component which comprises a second internal coolant bore which is realized as a coiled bore, and, on a second face side end, a second connection interface, wherein the second connection interface comprises a second end face for attaching the joining material as well as an elongated groove which is provided in the second end face, runs along a straight line, extends at least over a major part of the width of the second tool component in the radial direction and divides the second end face into two equally-sized second part-end faces, wherein a second coolant outlet of the second internal coolant bore is arranged in the elongated groove;
    wherein the first tool component and the second tool component are joined together by means of the joining material attached to the first and second end faces in such a manner that the first coolant outlet is aligned with the second coolant outlet.

2. Tool according to claim 1, wherein the first tool component comprises a first alignment face and the second tool component comprises a second alignment face which corresponds with the first alignment face, wherein a distance from the first alignment face to the first coolant outlet is as large as a second distance from the second alignment face to the second coolant outlet.

3. Tool according to claim 2, wherein the first tool component additionally comprises a third alignment face, wherein the first and the third alignment faces are arranged on oppositely situated sides on an outer circumference of the first tool component and in each case run transversely with respect to the first end face, and wherein the second tool component additionally comprises a fourth alignment face, wherein the second and the fourth alignment faces are arranged on oppositely situated sides on an outer circumference of the second tool component and run transversely with respect to the second end face.

4. Tool according to claim 3, wherein at least parts of the first and of the third alignment faces are arranged on oppositely situated ends of the feather key, and wherein at least parts of the second and of the fourth alignment faces are arranged at oppositely situated ends of the groove.

5. Tool according to claim 1, wherein the second coolant outlet is arranged in a groove base of the groove, and wherein the first coolant outlet is arranged on the top surface of the feather key which, in a connected state of the two tool components, contacts the groove base.

6. Tool according to claim 1, wherein a plurality of first internal coolant bores are provided in the first tool component and a plurality of second coolant bores are provided in the second tool component, wherein each of the first internal coolant bores opens out into a respective first coolant outlet which is arranged on the elongated feather key, and each of the second internal coolant bores opens out into a respective second coolant outlet which is arranged in the elongated groove, wherein both the first coolant outlets and the second coolant outlets are arranged in a decentral manner, that is not centrally on the respective tool component, and wherein, in a connected state of the two tool components, the first coolant outlets are aligned with the second coolant outlets.

7. Tool according to claim 1, wherein the first tool component and the second tool component are soldered or bonded together at the first and the second connection interface, and in a corresponding manner the joining material comprises either a soldering or a binding material.

8. Tool according to claim 1, wherein the tool is a drilling, turning, milling, feather keyway broaching or reaming tool.

9. Tool according to claim 1, wherein the first or the second tool component is produced from carbide, and the respective other tool component is produced from steel.

10. Tool according to claim 1, wherein the first or the second tool component is realized as a tool shank, and the respective other tool component is realized as a connection piece which comprises a receiving means for a cutting insert.

11. Tool component for a tool for machining a workpiece, said tool component having:
    a first internal coolant bore which is realized as a coiled bore, and
    a first connection interface which is arranged on a first face side end of the tool component and serves for connecting the tool component to another tool component,
    wherein the first connection interface comprises a first end face for attaching a joining material for connection to the other tool component as well as an elongated feather key which protrudes from the first end face, runs along a straight line, extends at least over a major part of the width of the first tool component in the radial direction and divides the first end face into two equally-sized first part-end faces, and wherein a first coolant outlet of the first internal coolant bore is arranged on the elongated feather key.

12. Tool component for a tool for machining a workpiece, said tool component having:
    a second internal coolant bore which is realized as a curved, non-linear bore, and
    a second connection interface which is arranged on a second face side end of the tool component and serves for connecting the tool component to another tool component,
    wherein the second connection interface comprises a second end face for attaching a joining material for connection to the other tool component as well as an elongated groove which is provided in the second end face, runs along a straight line, extends at least over a major part of the width of the second tool component in the radial direction and divides the second end face into two equally-sized second part-end faces, wherein a second coolant outlet of the second internal coolant bore is arranged in the elongated groove.

13. Method for producing a tool for machining a workpiece, said method having the method steps:

providing a first tool component which comprises a first internal coolant bore which is realized as a coiled bore, and, on a first face side end, a first connection interface, wherein the first connection interface comprises a first end face for attaching a joining material as well as an elongated feather key which protrudes from the first end face, runs along a straight line, extends at least over a major part of the width of the first tool component in the radial direction and divides the first end face into two equally-sized first part-end faces, wherein a first coolant outlet of the first internal coolant bore is arranged on the elongated feather key;

providing a second tool component which comprises a second internal coolant bore which is realized as a curved, non-linear bore, and, on a second face side end, a second connection interface, wherein the second connection interface comprises a second end face for attaching the joining material as well as an elongated groove provided in the second end face, runs along a straight line, extends at least over a major part of the width of the second tool component in the radial direction and divides the second end face into two equally-sized second part-end faces, wherein a second coolant outlet of the second internal coolant bore is arranged in the elongated groove;

providing a joining material to the first and/or second end face;

aligning the first tool component relative to the second tool component, in such a manner that the first coolant outlet aligns with the second coolant outlet;

connecting the first connection interface of the first tool component to the second connection interface of the second tool component by means of the joining material.

* * * * *